June 8, 1937. J. H. CAFFREY 2,082,870
GARBAGE INCINERATOR
Filed Nov. 5, 1935 5 Sheets-Sheet 1
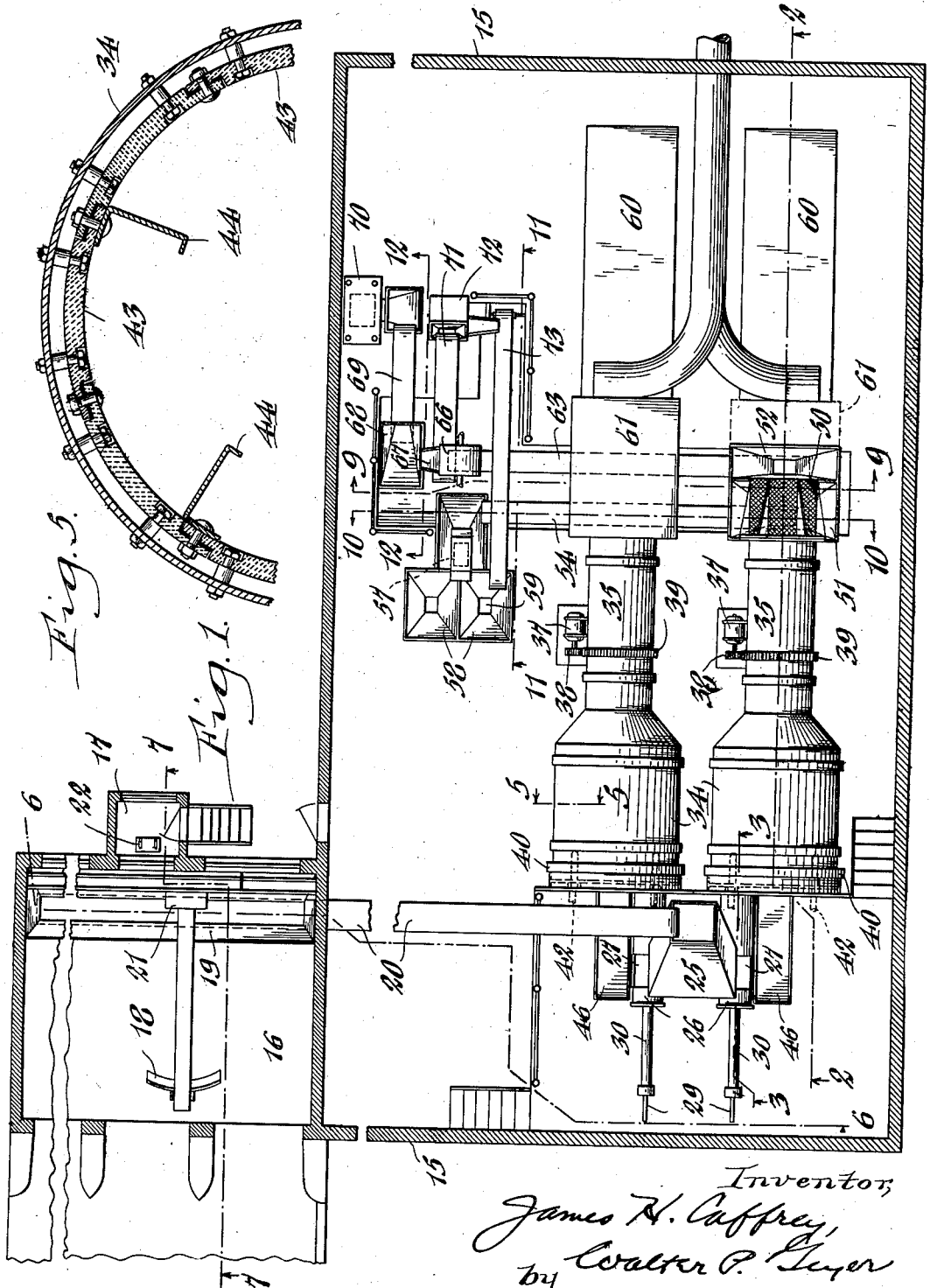

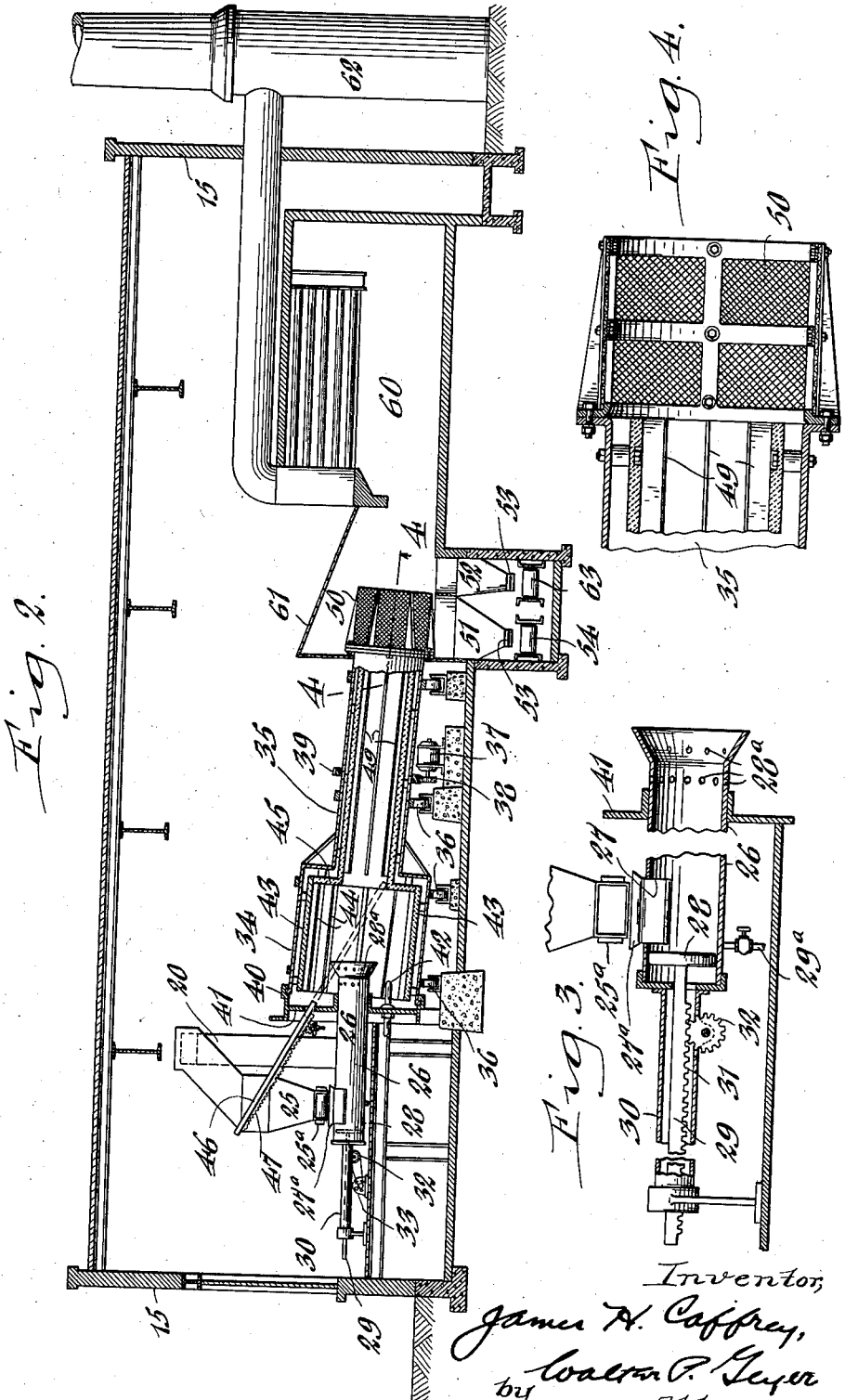

June 8, 1937. J. H. CAFFREY 2,082,870
GARBAGE INCINERATOR
Filed Nov. 5, 1935 5 Sheets-Sheet 3
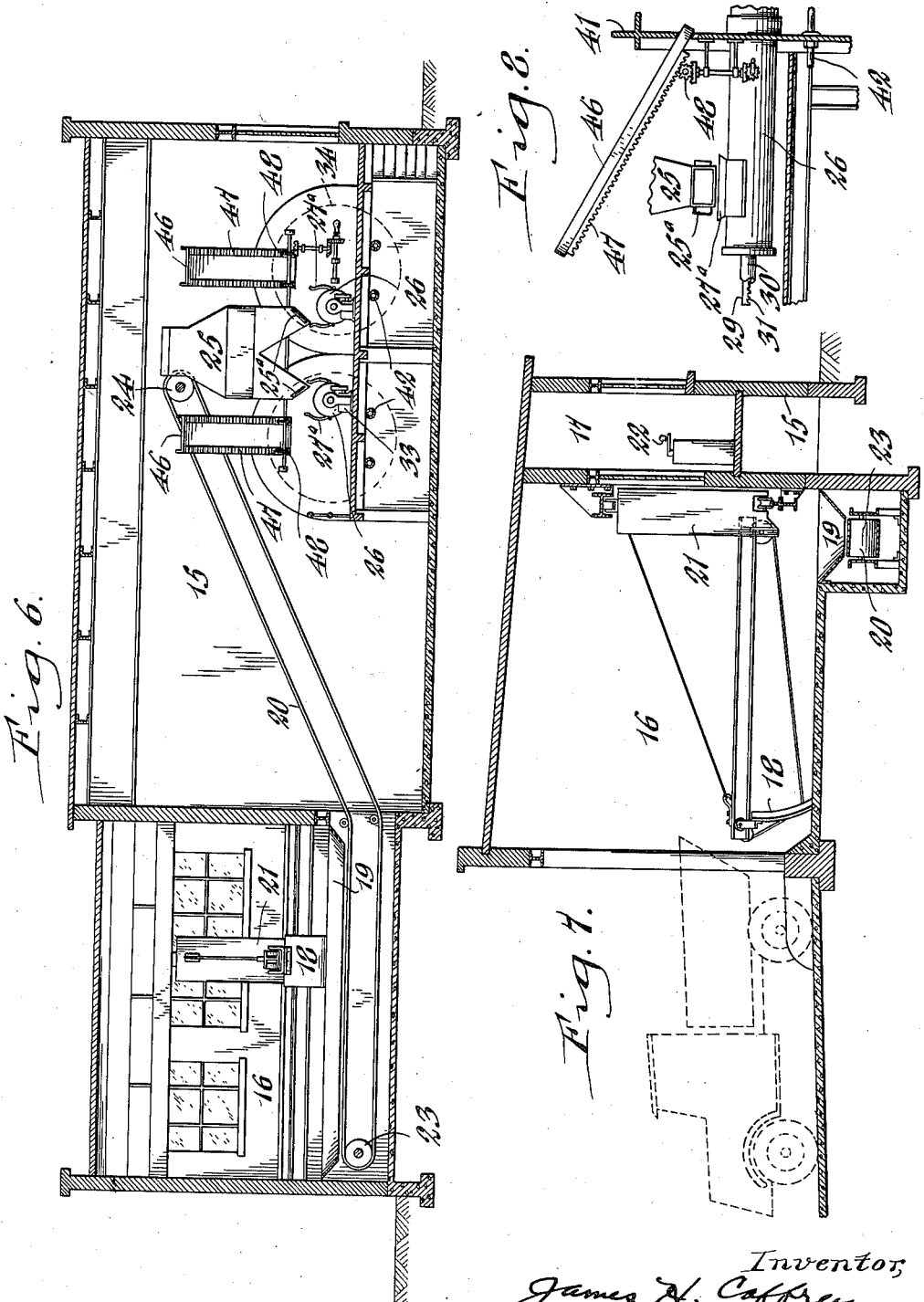
Inventor,
James H. Caffrey,
by Walter P. Geyer
Attorney.

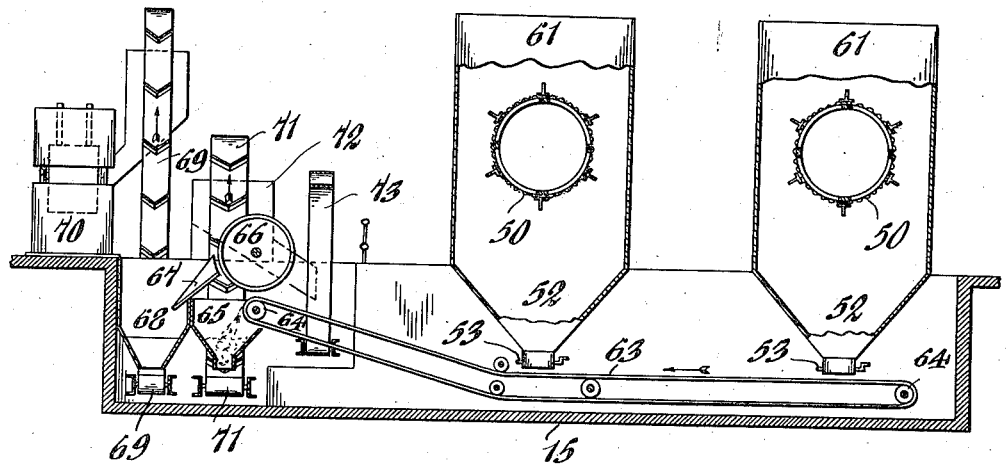
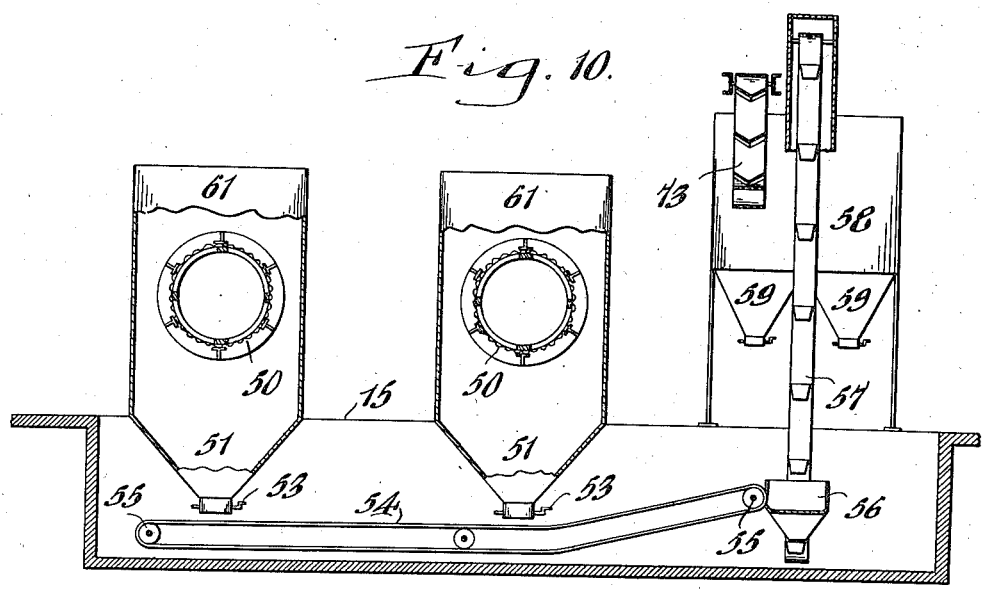

June 8, 1937.  J. H. CAFFREY  2,082,870
GARBAGE INCINERATOR
Filed Nov. 5, 1935  5 Sheets-Sheet 5
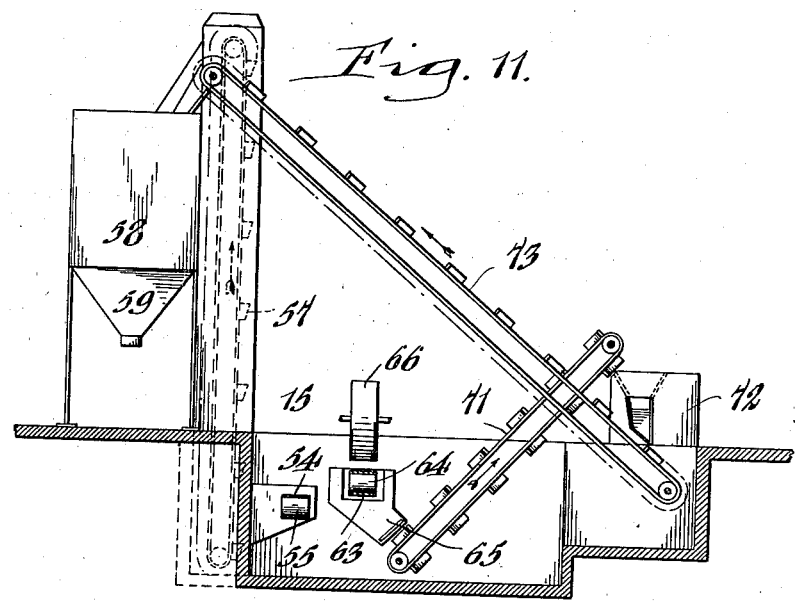
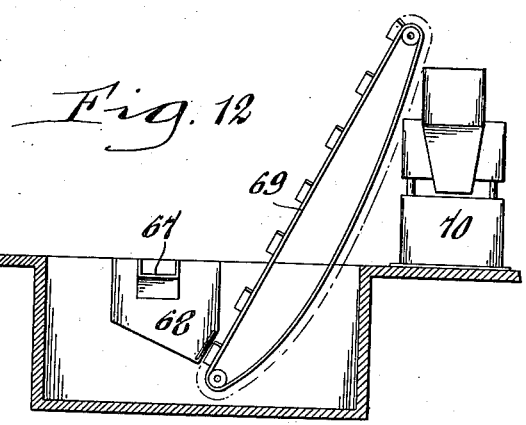
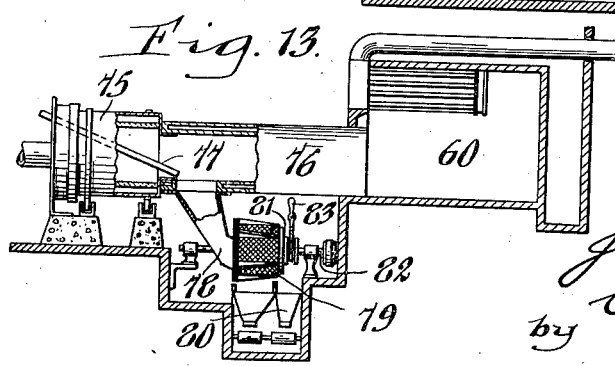
Inventor,
James H. Caffrey,
by Walter P. Geyer
Attorney.

Patented June 8, 1937

2,082,870

UNITED STATES PATENT OFFICE 2,082,870

GARBAGE INCINERATOR

James H. Caffrey, Buffalo, N. Y.

Application November 5, 1935, Serial No. 48,359

8 Claims. (Cl. 110—14)

This invention relates generally to certain new and useful improvements in incineration but more particularly to an apparatus for and method of disposing of the refuse and garbage of municipalities, and of reclaiming the products of incineration for fertilizer and other uses.

One of its objects is the provision of a method and apparatus of this character which is so designed and constructed as to thoroughly, expeditiously and economically consume the garbage and other combustible refuse and reduce it to an ash or pulverized state suitable for fertilizing and other purposes, which effects the separation of the non-combustible matter, such as glass, metal, etc., for reclamation purposes, and which is further so designed as to reduce to a minimum the generation and emission of offensive and obnoxious odors into the surrounding atmosphere during the incineration treatment and wherein the various stages of treatment are effected in a sanitary manner, both from the standpoint of handling and from that of the operators, and which utilizes the heat derived from incineration for generating steam for power and heating purposes.

Another object of the invention is to provide a garbage incinerating plant or apparatus which is designed to eliminate city dumps and to require a minimum of area for its installation and a minimum of attendants to operate it, thereby affording a material saving in the initial investment as well as in labor and maintenance costs.

A further object is to provide an efficient garbage incinerator for towns and municipalities having novel means for effecting the charging and handling of the refuse and garbage in a sanitary manner with the operators isolated from contact with the material, and wherein the various stages of charging, drying, burning or cremating, and separating of the ash or residue for fertilizer purposes and the unburned material for reclamation purposes is continuous and practically automatic in operation.

Other features of the invention reside in the construction and arrangement of parts hereinafter described and particularly pointed out in the appended claims.

In the accompanying drawings:—

Figure 1 is a top plan view of my improved incinerating apparatus, the building structure housing it being shown in section. Figure 2 is a vertical longitudinal section taken substantially in the plane of line 2—2, Figure 1. Figure 3 is an enlarged longitudinal section of the charging unit taken substantially in line 3—3, Figure 1. Figure 4 is a similar section of the discharge end of the flue and screen taken on line 4—4, Figure 2. Figure 5 is an enlarged fragmentary cross section of the revolving furnace taken in the plane of line 5—5, Figure 1. Figure 6 is a cross section taken on line 6—6, Figure 1. Figure 7 is an enlarged section taken in the plane of line 7—7, Figure 1. Figure 8 is an enlarged fragmentary side elevation of the retractable discharge chute and associated parts. Figures 9 and 10 are enlarged cross sections taken on the correspondingly numbered lines in Figure 1. Figure 11 is a vertical section taken substantially in the plane of line 11, Figure 1. Figure 12 is a similar section taken on line 12, 12, Figure 1. Figure 13 is a sectional elevation of a modified form of the apparatus.

Similar characters of reference indicate corresponding parts throughout the several views.

The various parts of my improved incinerator are housed within a building structure 15 having at one end thereof a receiving room or section 16 onto the floor of which the garbage or refuse from the collection vehicles is dumped. Operatively mounted within this room and controlled by an operator housed within a compartment 17 where he is isolated from the stench and foul odors issuing from the garbage, is a scraper 18 of any suitable and well known construction which is adapted to rake or scrape the garbage onto an apron 19 from which it falls by gravity onto an endless conveyor or belt 20. As shown in Figure 7, the scraper is mounted on a horizontally movable crane or carrier 21 suitably supported at the hopper end of the building section 16, and suitable motive means controlled by an operating lever 22 located within the compartment 17 is provided for actuating the crane and scraper to deliver the dumped garbage onto the conveyor 20.

The conveyor 20 is disposed at one end below the floor of the building section 15 where it passes around a guide pulley 23, while its opposite or discharge end extends upwardly into the adjoining end of the main building structure 15 and passes around a guide pulley 24 positioned adjacent a hopper 25 into which the garbage drops by gravity. From the hopper the garbage is emptied into one or more feeding or charging units which function to gradually feed and introduce the garbage into companion furnace units wherein the garbage is dried and burned. Two of such charging and furnace units are shown in the drawings each being preferably constructed as follows:

The charging unit consists of a feed tube or cylinder 26 of square or round cross section, disposed horizontally beneath the hopper 25 and having a feed opening 27 adjacent one end through which the garbage drops from the discharge end of the hopper, the latter having a suitable closure 25ª for controlling the garbage-flow into the cylinder. The feed opening is normally closed by hinged cover-sections 27ª. Operating in this charging cylinder for effecting the discharge of the garbage therefrom into the furnace, is a feed plate or piston 28 applied to one end of a rod or stem 29 guided in a sleeve 30 and having a gear rack 31 thereon with which a pinion 32 engages for shifting the piston forwardly and backwardly in its cylinder, a reversible motor 33 or like power means being employed for this purpose. The piston is operated at a comparatively slow speed so as to effect a gradual and continuous feeding of the garbage from the charging unit into the furnace. During the forward or charging stroke any excess moisture in the garbage or squeezed therefrom is forced back of the piston at its periphery or through openings 28ª therein, and the cylinder may be drained from time to time through a drain pipe 29ª into the sewer. The piston stroke is somewhat shorter than that of the length of the cylinder 26, so that after its charging stroke there is a plug of garbage remaining in the discharge end of the cylinder, this plug constituting a closure to prevent back draft of the gases from the furnace into the cylinder.

Each furnace unit is in the form of a revolving cylindrical chamber drum or retort 34 in which the garbage is dried and burned. This drum has its axis substantially horizontal and has a communicating tubular extension or flue 35 of reduced diameter projecting from its front end and which extension revolves as a unit with the furnace drum and wherein the gases omitted during incineration are consumed and through which the burnt and unburnt materials are conveyed after incineration. This revolving furnace and its tubular extension are slightly inclined to convey the material forwardly and are supported for revolving movement on suitable rollers 36 which engage the undersides of the peripheral parts of the drum and extension, as shown in Figure 2. The furnace is adapted to be revolved at a comparatively slow speed from a suitable motor 37, preferably of the reversing type, through the medium of a pinion 38 and ring gear 39. The rear end of the revolving furnace is supported in an annular bearing flange 40 projecting from a plate or wall 41 which not only provides a closure for the open feed end of the furnace but which also constitutes a support for the open or discharge end of the feed tube 26, the latter projecting into the furnace in the manner shown in Figure 2, and being preferably flared and perforated at its outlet end to permit the expansion of the garbage and refuse resulting from the heat of the furnace and to expedite its drying. For the purpose of drying and burning the garbage in the furnace, a gas or oil burner 42 is provided which is likewise supported on the wall 41 and extends into the lower portion of the furnace drum.

While the revolving furnace-drum may be of any suitable and well known construction, it is preferably made up of an outer steel shell and an inner lining 43 of a refractory or heat-resisting material which is spaced from the shell to provide an air space and to allow for expansion and contraction. If desired, the outer shell may be lined with asbestos. On its interior wall the drum has a plurality of suitably spaced radial vanes or blades 44 of substantially channel shape which intercept the material and carry it part way around and then release it so that it passes through the flame of the burner, thereby thoroughly and constantly agitating the material within the drum to expedite its drying and burning. During operation, the walls of the furnace-drum become highly heated and this likewise serves to augment the drying action of the garbage, the heat, however, within the drum being evenly distributed over its entire area and not being concentrated at any one point. It will be noted by reference to Figure 2, that the furnace-drum 34 is larger in diameter than its extension or flue 35 and a resulting web or bridge wall 45 is provided which retains the garbage within the drum during drying and cremating.

After the garbage has been incinerated, it is directed and discharged into the flue 35 through the medium of a chute or discharger 46 which normally assumes an inoperative position retracted from the furnace-drum 34 and which is adapted to be projected into and substantially centrally of the drum where it intercepts the garbage picked up by the blades 44 and directs it into the adjoining end of the flue, as seen in Figure 2. This chute may be slidingly supported on the furnace-wall 41 and may be actuated into and out of its operative discharging position by means of a rack 47 and motor-driven pinion 48. During incineration the furnace-drum is revolved in one direction, while during the discharge operation of the incinerated garbage into the flue the drum is reversed, the channeled blades 44 being so disposed as to retain the burnt-residue therein during reversal of the drum and then empty it over the discharge chute. After the drum is emptied of its incinerated mass, the discharge chute is retracted, the drum is again reversed to revolve in its normal direction and the gradual feeding of garbage is resumed.

The flue 35 is substantially the same in construction as the furnace-drum 34 and has blades 49 on its inner wall which intercept the incinerated garbage and, together with the unburnt residue, such as glass, steel, etc., thoroughly agitate and reduce the burnt material to an ash condition. This flue also serves as a passage for the gases and products of combustion issuing from the garbage during incineration. During the agitation of this material through the flue it travels lengthwise through the same and is finally introduced into a screening drum 50 suitably secured to the open end of the flue, the ash content sifting through the drum and the remaining material passing on through the drum and being discharged from its open front end. Disposed below the screening drum is a hopper 51 for receiving the ash content and disposed at one side thereof and beyond the open end of this drum is a like hopper 52 into which the unscreened material drops by gravity. These hoppers are provided with suitable slide closures 53 for controlling the discharge of the materials therefrom.

From the hopper 51 the ash content of the incinerated garbage is delivered to a conveyor 54 disposed below the discharge mouths of the hoppers 51, this conveyor passing around guide pulleys 55 and communicating at its discharge end with a hopper 56. Communicating with the discharge mouth of this hopper is a bucket elevator 57 which conveys the ash material to a storage bin 58. As seen in Figure 10, this bin is provided with one or more discharge spouts 59 from which the ash may be discharged from time to time into suitable vehicles, this ash being particularly adapted for use as a fertilizer.

The flue 35 preferably opens at its discharge end into a boiler structure 60 including a hood 61 which extends over and houses the screening drum 50 and thereby serves as a collector for the dust issuing from the flue during the screening of the material. This dust as well as the products of combustion issuing from the flue 35 travel through the boiler structure and thence into the stack 62. By this construction the heat derived from the incineration treatment is utilized to generate steam in the boiler structure for power or heating purposes.

The solid or unscreened matter discharged over the end of the screening drum 50, and which consists of cans, glass, bones and other metallic particles, is discharged from the hopper 52 onto a conveyor 63 supported on guide pulleys 64 and communicating at its discharge end with a hopper 65. Adjoining the discharge end of this conveyor is a magnetic pick-up 66 which may be of any suitable and well known construction and which functions to attract the magnetic particles present in the material carried by the conveyor 63. The attracted material is conveyed by the magnetic pick-up to a chute 67 from which it is discharged into a receiving hopper 68. From the hopper 68 the magnetic particles are delivered to a bucket elevator 69 and thence conveyed to a suitable press 70 and prepared in blocks or bales and sold to scrap metal dealers and the like.

The non-magnetic and non-metallic particles carried by the conveyor 63 and delivered to the hopper 65 are thence delivered to a bucket conveyor 71 which communicates at its discharge end with a pulverizer 72 which functions to reduce the material to a finely divided condition. This pulverizer may be of any suitable and well known construction. From the pulverizer the material is delivered to a bucket elevator 73 which conveys the material to the storage bin 58 where it is mixed with the ash screened through the screening drum 50.

In practice, the various conveyors are preferably covered or enclosed in any appropriate fashion for handling the garbage in as sanitary a manner as possible and suitable drainage facilities are provided in the plant for taking care of the liquid content of the garbage on the receiving floor and at other points between such floor and the furnace.

When it is desired to use the garbage primarily as a fuel for generating high pressure steam for municipal heating and power purposes, the arrangement disclosed in Figure 13 is employed. In this form of my invention, 75 indicates the revolving furnace and 76 indicates a horizontal, stationary, water-jacketed flue in axial alinement with the furnace, communicating at one end therewith and at its opposite end with the boiler for conducting the heat and products of combustion directly to the latter. The incinerated mass is directed through the chute 77 into a conduit 78 and thence to a revolving screen 79 disposed beneath the flue 76, the finer material passing through the screen and the other materials traveling lengthwise therethrough and into a hopper 80. In order to effect a tumbling action of the material in the revolving screen 79 for a given time period to insure thorough separation, I provide the open discharge end of this screen with a closure 81 which is slidable axially of a supporting shaft 82 and actuated by a shifting lever 83. After the screen has operated over a desired period, the closure is opened and the unscreened material is discharged from the screen into the hopper 80.

This improved disposal plant, while compact in construction and efficient and practically automatic in operation, effects the incineration of the garbage expeditiously, economically and without emitting the resulting odoriferous fumes into the atmosphere, thereby permitting the plant to be conveniently located within the city limits for the most efficient handling of garbage collection. Furthermore, by the methods of handling after incineration, the municipality is assured a substantial income from the by-products of incineration.

I claim as my invention:—

1. An incinerator for garbage and the like, comprising a charging unit having an inlet and an outlet and including means for gradually feeding the garbage therethrough toward said outlet, a revolving furnace-drum adjoining said charging unit and into which its outlet extends, said drum having means for lifting and dropping the material as it is revolved and including a flue-like extension for the passage of the incinerated material and for the gases emitted during incineration, and means for intercepting the incinerated material in the drum and discharging it into said extension.

2. An incinerator for garbage and the like, comprising a charging unit having an inlet and an outlet and including means for feeding the garbage toward said outlet, a revolving furnace adjoining said charging unit and with which its outlet communicates, said furnace having means for carrying the material with it and then letting it drop by gravity, means communicating with said furnace for receiving the incinerated material, and means disposed exteriorly of the furnace and projectible into the furnace in intercepting relation to the gravity-falling incinerated material for guiding and directing it into said receiving means.

3. An incinerator for garbage and the like, comprising a charging unit having an inlet and an outlet and including means for feeding the garbage toward said outlet, a revolving furnace adjoining said charging unit and with which its outlet communicates, said furnace having material-intercepting blades on its inner wall, means communicating with said furnace for receiving the incinerated material, and a chute normally stationed exteriorly of the furnace and projectible into the same substantially longitudinally thereof for intercepting the incinerated material and directing it into said receiving means.

4. An incinerator for garbage and the like, comprising a charging unit having an inlet and an outlet and including means for feeding the garbage toward said outlet, a revolving furnace adjoining said charging unit and with which its outlet communicates, said furnace having substantially radial blades projecting inwardly thereof, means for revolving said furnace alternately in opposite directions, means communicating with the furnace for receiving the incinerated material, said furnace revolving in one direction during incineration, and means projectible into the furnace for intercepting the incinerated material and delivering it into said receiving means, said furnace being revolved in the reverse direction during such delivery and said furnace-blades picking up the material and dropping it over said delivery means.

5. An incinerator for garbage and the like, comprising a charging unit having an inlet and an outlet and including means for gradually feeding the garbage therethrough toward said outlet, a revolving furnace-drum adjoining said charging unit and into which its outlet extends, said drum including a flue-like extension for the passage of the incinerated material and for the gases emitted during incineration, and an inclined delivery chute normally disposed exteriorly of the furnace-drum and projectible into the same substantially centrally thereof for intercepting the incinerated material and directing it into said flue-like extension, said drum having means thereon for lifting and dropping the material onto the chute.

6. An incinerator for garbage and the like, comprising a revolving furnace-drum open at one end having means for tumbling the material therein and having a flue extending from its opposite end, means for supporting said drum and its extension for rotation, a combined supporting frame and closure at the open end of the drum having a bearing flange for receiving such open end, a charging unit extending through said supporting frame into said drum and including means for feeding the garbage therethrough into the drum, and means extending through said frame and projectible into said drum for intercepting the incinerated material as it is tumbled by the drum and delivering it into said flue.

7. An incinerator for garbage and the like, comprising a revolving furnace-drum open at one end and having a flue extending from its opposite end, means for supporting said drum and its extension for rotation, a combined supporting frame and closure at the open end of the drum having a bearing flange for receiving such open end, a charging unit communicating with said furnace-drum and including a feed cylinder extending through said frame into the drum and having means operable therein for propelling the garbage therethrough into the drum, and a delivery chute slidably supported on said frame and projectible into said drum for intercepting the incinerated material and delivering it into said flue, said furnace-drum having means thereon for lifting and dropping the material onto the chute.

8. An incinerator of the character described, comprising a revolving furnace-drum having a communicating flue for the discharge of the gases and incinerated material, means for revolving the same at a comparatively slow speed, a charging unit for delivering the garbage to said furnace-drum including a cylinder and piston, the cylinder discharging into said drum, means projectible into the latter for intercepting the incinerated material and delivering it into said flue, said drum having means thereon for lifting and dropping the material onto said delivering means, and a separating unit in communication with said flue for separating the fine incinerated material from the coarse.

JAMES H. CAFFREY.